US012810343B2

(12) United States Patent
Putrevu et al.

(10) Patent No.: US 12,810,343 B2
(45) Date of Patent: Nov. 24, 2026

(54) TRAINING A MODEL TO PREDICT TRAVEL DISTANCE BETWEEN TWO GEOGRAPHIC LOCATIONS

(71) Applicant: Maplebear, Inc., San Francisco, CA (US)

(72) Inventors: Jagannath Putrevu, San Francisco, CA (US); Reza Faturechi, San Francisco, CA (US)

(73) Assignee: Maplebear, Inc., San Francisco, CA (US)

( * ) Notice: Subject to any disclaimer, the term of this patent is extended or adjusted under 35 U.S.C. 154(b) by 1106 days.

(21) Appl. No.: 17/338,421

(22) Filed: Jun. 3, 2021

(65) Prior Publication Data

US 2022/0391965 A1 Dec. 8, 2022

(51) Int. Cl.

| | |
|---|---|
| ***G06Q 30/06*** | (2023.01) |
| ***G01C 21/20*** | (2006.01) |
| ***G06N 3/084*** | (2023.01) |
| ***G06N 20/20*** | (2019.01) |
| ***G06Q 10/087*** | (2023.01) |
| ***G06Q 30/0601*** | (2023.01) |

(52) U.S. Cl.

CPC ....... *G06Q 30/0633* (2013.01); *G01C 21/206* (2013.01); *G06N 3/084* (2013.01); *G06N 20/20* (2019.01); *G06Q 10/087* (2013.01)

(58) Field of Classification Search

USPC ........................................................ 701/434

See application file for complete search history.

(56) References Cited

U.S. PATENT DOCUMENTS

| | | | | |
|---|---|---|---|---|
| 10,078,337 | B1 * | 9/2018 | Yao ...................... | G05D 1/0274 |
| 11,803,894 | B2 * | 10/2023 | Putrevu .............. | G06Q 30/0284 |
| 2019/0316924 | A1 * | 10/2019 | Morgan-Brown ... | G06N 3/0499 |
| 2022/0327482 | A1 * | 10/2022 | Meanor .................. | G06N 20/20 |

* cited by examiner

*Primary Examiner* — Adam D Tissot

(74) *Attorney, Agent, or Firm* — Fenwick & West LLP

(57) ABSTRACT

An online concierge system receives orders from users and assigns orders to shoppers for fulfillment. Each order specifies a destination location and a warehouse from which items in the order are obtained. When assigning orders to shoppers, the online concierge system seeks to minimize distances traveled by shoppers fulfilling orders. To more efficiently assign orders to shoppers, the online concierge system trains a distance prediction model to predict a distance traveled between a starting location and a destination location from the starting location, the destination location, and a Haversine distance between the destination location and the starting location. Information identifying distances traveled by shoppers when fulfilling previous orders or information about distances between locations from a third party system may be used to train the distance prediction model.

20 Claims, 5 Drawing Sheets

TRAINING A MODEL TO PREDICT TRAVEL DISTANCE BETWEEN TWO GEOGRAPHIC LOCATIONS

BACKGROUND

This disclosure relates generally to ordering items from an online concierge system, and more specifically to an online concierge system determining distances for shoppers to travel to fulfill orders for items when assigning orders to shoppers for fulfillment.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in a user's order in a warehouse and deliver the items included in the order to a location specified by the user.

To efficiently fulfill orders and provide items to users, an online concierge system assigns orders from one or more users to a shopper, allowing the shopper to fulfill orders from multiple users to decrease amounts of time between the online concierge system receiving an order and users receiving items from corresponding orders. When assigning orders to shoppers, many conventional online concierge systems account for distances for a shopper to travel to fulfill different orders to minimize a total distance traveled by the shopper. For example, an online concierge system generates a group of multiple orders that specify locations within a threshold distance of each other and assigns the group of orders to a shopper, minimizing an aggregate distance the shopper travels to fulfill orders.

When determining a distance traveled by a shopper to fulfill an order, an online concierge system may use a Haversine distances between a starting point of the shopper and a location, the Haversine distance between the starting point and a location is often inaccurate. As different geographical areas have different physical features or layouts, the Haversine distance between two points has varying accuracies in describing a distance traveled between two points. For example, in a geographic area with a grid layout and one way streets, such as in a city, the Haversine distance between two points does not account for overall distance a shopper traverses across the grid while accounting for limitations on directions of travel when using different streets.

Some online concierge systems increase the accuracy of determined distances for a shopper to travel between two points by using a more detailed predictive model of travel between two points or querying a third party system that generates the distances between two points provided by the online concierge system. While more accurate in determining distance, such a third party system or more detailed predicted model is computationally expensive. As a number of pairs of locations for which distances are determined increases, processing time, processing power, and storage capacity increase significantly, increasing an overall amount of resources used for determining distances or increasing an amount of time necessary for determining distance. Hence, conventional online concierge systems may conserve computational resources and computation time at the expense of accuracy by determining a distance a shopper travels by determining Haversine distance or may increase accuracy of shopper distance through a more detailed predictive model, while increasing computational resources and computation time for determining the distance the shopper travels.

SUMMARY

As an online concierge system receives orders from users, the online concierge system assigns the orders to shoppers. A shopper obtains one or more items included in an order assigned to the shopper from a warehouse and delivers the items to a location specified by the order to fulfill the order. As a shopper fulfills an order assigned to the shopper, the online concierge system obtains information describing a distance traveled by the shopper to fulfill the order. In some embodiments, the online concierge system receives location information from a client device executing a shopper mobile application providing directions to the shopper for reaching a location when the shopper fulfills the order. This allows the online concierge system to determine a distance travelled by the shopper when fulfilling the order. The online concierge system stores a starting location and a destination location for the order in association with a distance travelled by the shopper when fulfilling the order. In some embodiments, the online concierge system receives directions for the shopper reaching a location specified by the order from a third party system and transmits the received directions to the shopper mobile application for the shopper, providing the shopper with directions for reaching the location identified by the order. In various embodiments, the online concierge system locally stores a copy of the directions received from the third party system in association with a starting location and a destination location, as well as a determined travel distance between the starting location and the destination location. Hence, the online concierge system obtains information describing distances between different pairs of starting locations and destination locations.

The online concierge system leverages the obtained information describing distances between different pairs of starting locations and destination locations to generate and to train a distance prediction model that outputs a predicted travel distance between a starting location and a destination location. To generate the distance prediction model, the online concierge system determines a Haversine distance between pairs of starting location and corresponding destination location in the obtained information. In various embodiments, the starring location comprises a starting latitude and a starting longitude, while the destination location comprises a destination latitude and a destination longitude. In the preceding example, the online concierge system retrieves a starting latitude and a starting longitude and a corresponding destination latitude and a destination longitude from the obtained data and determines a Haversine distance between the starting latitude and the starting longitude and the corresponding destination latitude and destination longitude. The online concierge system generates training data for the distance prediction model comprising a plurality of examples identifying a starting location, a destination location, and a Haversine distance between the starting location and the destination location. For example, each example consists of: a starting location, a destination location, and a Haversine distance between the starting location and the destination location. As an example, an example of the training data consists of a starting latitude, a starting longitude, a destination latitude, a destination longitude, and a Haversine distance determined between the starting latitude and the starting longitude and the destination latitude and the destination longitude. Each example of the training data is labeled with the distance between the pair of the starting location and the destination location obtained by the online concierge system. Hence, the online concierge system uses the distances obtained from fulfillment of orders as the labels for training the distance prediction model, allowing the online concierge system to leverage historical information about distances shoppers traveled when fulfilling orders.

The online concierge system applies the distance prediction model to each of a plurality of examples of the training data. For an example of the training data (which includes a starting location, a destination location, and a Haversine distance between the starting location and the destination location), application of the distance prediction model to the user generates a predicted distance for a shopper to travel between the starting location and the destination location. Including the Haversine distance between the starting location and the destination location as an input to the distance prediction model, The online concierge system determines an error term from a loss function based on a difference between the label applied to the example of the training data and the predicted distance for the shopper to travel between the starting location and the destination location. The online concierge system repeatedly backpropagates the one or more error terms from the label applied to an example of the training data and the predicted distance for the shopper to travel between the starting location and the destination location to the user through layers of a network comprising the distance prediction model. The backpropagation of the one or more error terms is repeated by the online concierge system until the one or more loss functions satisfy one or more criteria. In some embodiments, the online concierge system uses gradient descent or any other suitable process to minimize the one or more error terms in various embodiments.

In response to the one or more loss functions satisfying the one or more criteria and the online concierge system stopping the backpropagation of the one or more error terms, the online concierge system stores the set of parameters for the layers of the distance prediction network. For example, the online concierge system stores the weights of connections between nodes in the network as the set of parameters of the network in a non-transitory computer readable storage medium. Hence, training of the distance prediction model allows the online concierge system to generate and to store a neural network, or other machine learning model, that generates a predicted distance for a shopper to travel from a starting location to a destination location.

Alternatively, the online concierge system generates the trained distance prediction model as a tree based ensemble model combining multiple decision trees. In various embodiments, the online concierge system selects at least a set of examples of the training data (which each include a starting location, a destination location, and a Haversine distance between the starting location and the destination location) and trains a decision tree on each example of the set by applying a decision tree to each example and comparing a predicted distance from application of the decision tree to an example to a label applied to the example. For example, the decision tree iteratively selects features of an example of the training data and selects a feature causing a loss function to satisfy one or more criteria, for example a feature minimizing a squared error between a predicted distance from the decision tree and a label applied to the example of the training data. The online concierge system sums the loss function over each example of the set to determine a total loss function and selects a feature having a minimum total loss function across the examples of the training data. Subsequently, the online concierge system splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The distance prediction model comprises the set of trained decision trees, with individual decision trees predicting distance for a shopper to travel from a starting location to a destination location from the starting location, the destination location, and a Haversine distance between the starting location and the destination location and the distance prediction model outputting a predicted distance for a shopper to travel from the starting location to the destination location predicted by at least a threshold number of the decision trees.

As another example, the online concierge system trains multiple decision trees in series, training an initial decision tree as described above and determining a loss function for the initial decision tree based on differences between a predicted distance from the decision tree and a label applied to the example of the training data. For example, the loss function is a squared error function between the predicted distance and the label applied to the example of the training data. The online concierge system trains another decision tree based on the results of the loss function for each example of the training data and iteratively trains decision trees, with results of the loss function from a decision tree used to train an immediately subsequent decision tree. The online concierge system iteratively trains decision trees from the results of the loss function from another decision tree until a specific number of decision trees are trained. The output of the distance prediction model is a combination (e.g., a sum) of the predicted distance for a shopper to travel from the starting location to the destination location output by each of the trained decision trees.

After training and storing the trained distance prediction model, when the online concierge system receives an origin location and a destination location, the online concierge system determines a Haversine distance between the origin location and the destination location and applies the distance prediction model to the origin location, the destination location, and the Haversine distance between the origin location and the destination location. As the distance prediction model accounts for geographic conditions between the origin location and the destination location, providing a more accurate estimation of distance to travel between the origin location than the destination location than the Haversine distance between the origin location and the destination location. In various embodiments, the inputs to the trained distance prediction model are limited to the origin location (e.g., an origin latitude and an origin longitude), the destination location (e.g., a destination latitude and a destination longitude), and a Haversine distance between the origin location and the destination location.

In various embodiments, the online concierge system uses the predicted distance output by the distance prediction model as a feature for one or more additional models. For example, the online concierge system uses the predicted distance from the distance prediction model as an input to a model that generates a predicted time for a shopper traveling from an origin location to a destination location. Additionally, the online concierge system 102 selects one or more combinations of origin location and destination location based on the predicted distances from the distance prediction model and transmits the selected combinations of origin location and destination location to a third party system, which generates navigation information to direct a shopper from the origin location to the destination location. In various embodiments, the online concierge system selects combinations of origin location and destination location having less than a threshold position in a ranking based on predicted distances to transmit to the third party system, allowing the online concierge system to select pairs of origin location and destination locations with predicted distances that minimize an amount of travel by a shopper. In other embodiments, the online concierge system locally generates navigation information directing a shopper from an origin location to a destination location, so the online concierge system selects a set of pairs of origin locations and destination locations based on the predicted distances for a shopper to travel from an origin location to a corresponding destination location in a pair and generates navigation information for a shopper to travel from an origin location to a corresponding destination location in a pair. For example, the online concierge system selects a set of pairs of origin locations and corresponding destination locations having less than a threshold position in a ranking based on predicted distances and generates navigation information for the selected pairs of origin locations and corresponding destination locations for display to shoppers. By selecting the set of pairs of origin location and destination location for which navigation information is generated based on corresponding predicted distances, the online concierge system more efficiently allocates computational resources by limiting a number of pairs of origin locations and destination locations for which navigation information is generated.

As generation of the navigation information from an origin location to a destination location uses an increased amount of computational resources and computational time, reducing a number of pairs of origin locations and destination locations for which the navigational information is generated improves efficiency of the online concierge system. In conventional online concierge systems that do not use the distance prediction model further described above, navigation information is generated for a greater number of combinations of origin location and destination location, expending an increased amount of computational resources for navigation information generation and increasing an amount of time used to generate navigation information. Selecting a set of combinations of origin location and destination location based on predicted distances between combinations of origin location and destination location allows the online concierge system to reduce a number of combinations of origin location and destination location for which navigation information is generated by the online concierge system or by a third party system, improving efficiency of allocation of computational resources for generating navigation information.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
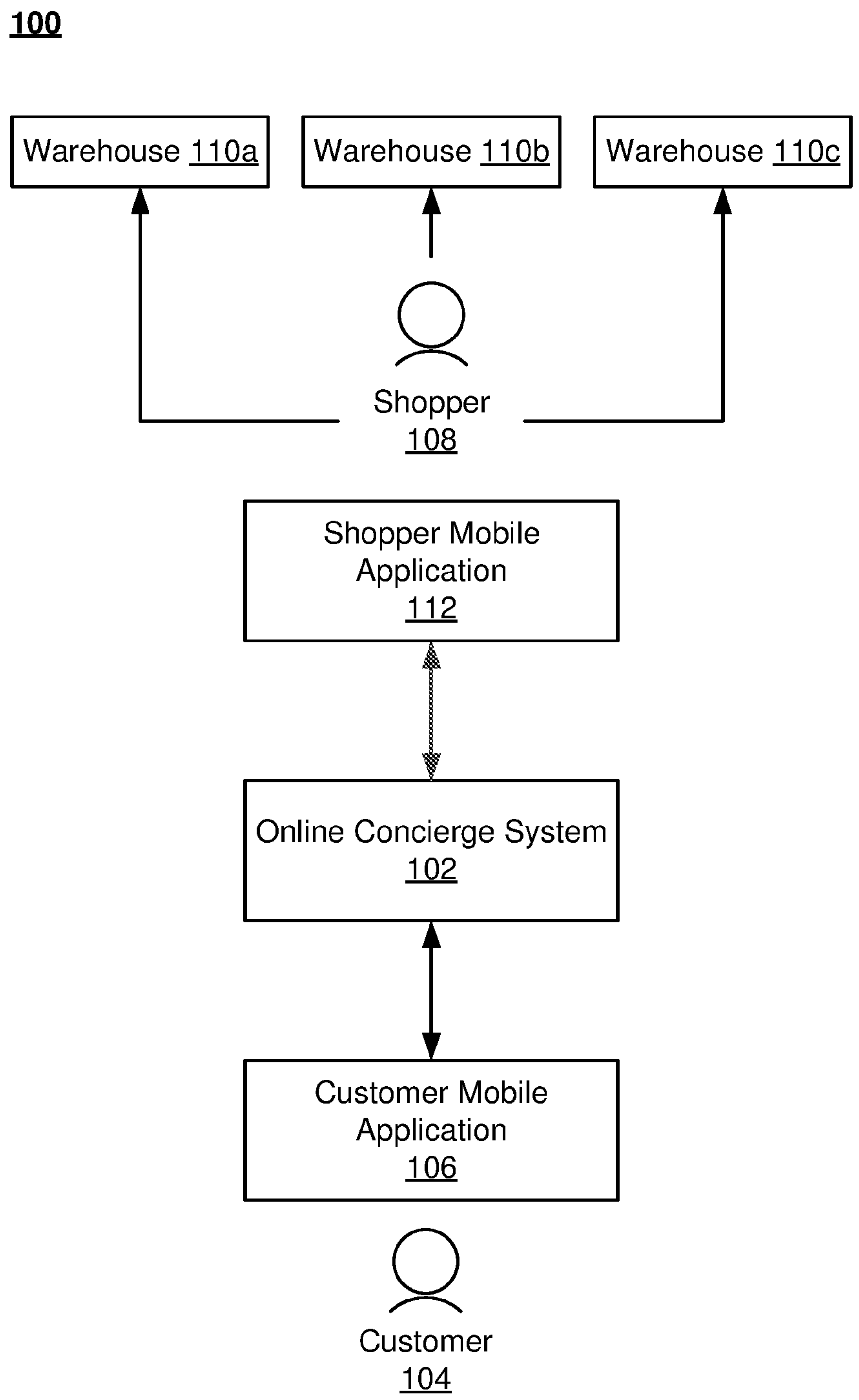
FIG. 1 illustrates an environment of an online shopping concierge service, according to one embodiment.

FIG. 1 illustrates an environment 100 of an online platform, according to one embodiment. The figures use like reference numerals to identify elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110*a*, 110*b*, and 110*c* (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
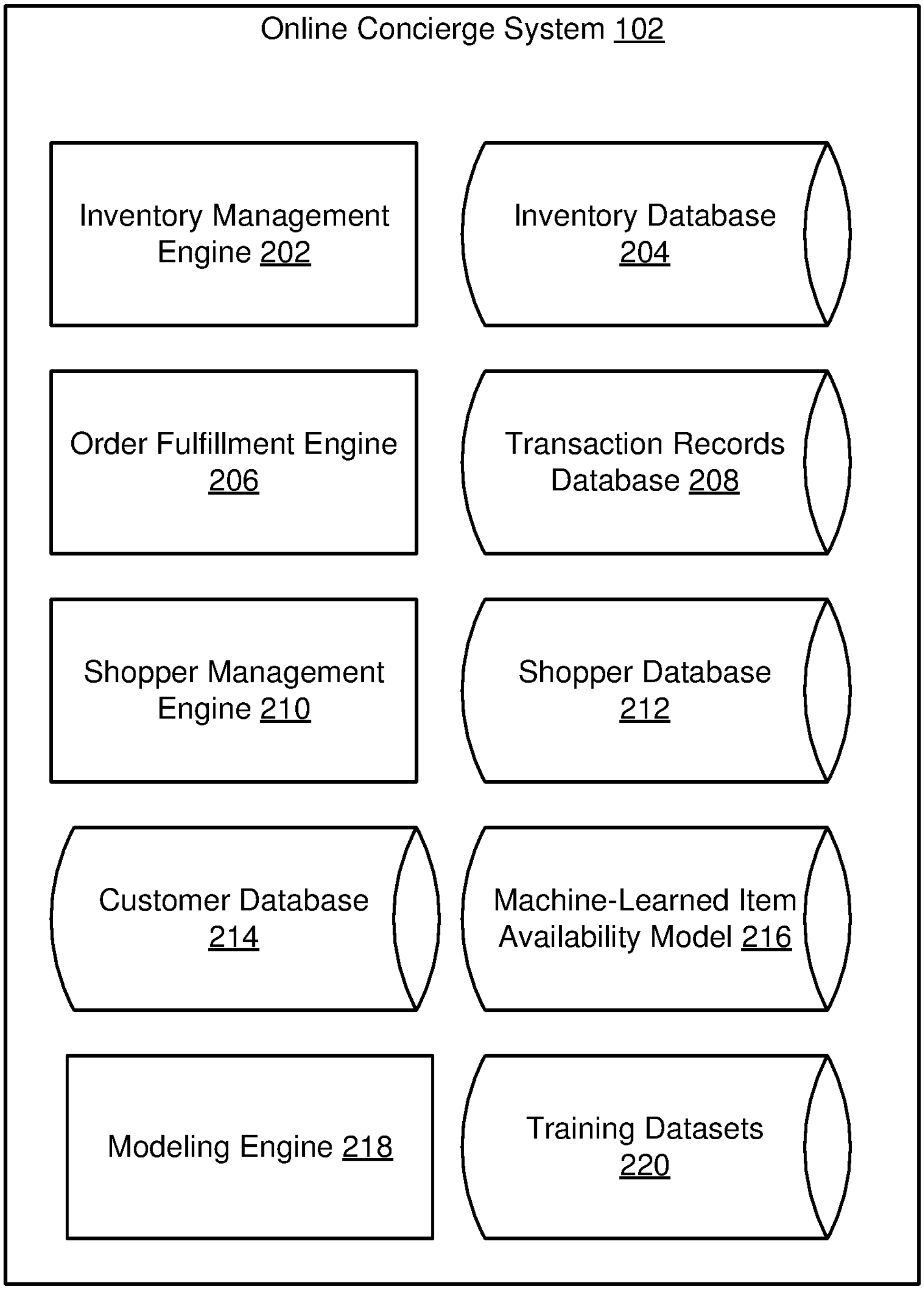
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220.

Additionally, in various embodiments the training datasets 220 include draining data describing distances shoppers traveled between a starting location and a destination location when fulfilling orders. For example, the training datasets 220 include a starting location, a destination location, and a Haversine distance between the starting location and the destination location labeled with a distance traveled by a shopper from the starting location to the destination location. The distance traveled by the shopper from the starting location to the destination location may be received from a client device used by the shopper to navigate from the starting location to the destination location or from a third party system that generates navigation information for traveling from the starting location to the destination location.

The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained distance prediction model that outputs a predicted distance for traveling from a starting location to a destination location. In various embodiments, the distance prediction model receives limited inputs to generate the predicted distance. For example, the distance prediction model is limited to receiving a starting location (e.g., a starting latitude and a starting longitude), a destination location (e.g., a destination latitude and a destination longitude), and a Haversine distance between the starting location and the destination location. As further described below in conjunction with FIGS. 4 and 5, because the distance prediction model is trained from distances traveled by shoppers between locations or from navigation information for a shopper to navigate between locations, the distance prediction model accounts for geographic features proximate to a starting location and a destination location, providing a more accurate estimation of a distance for a shopper to travel between different locations than a Haversine, or straight line, distance between the different locations.

Machine-Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
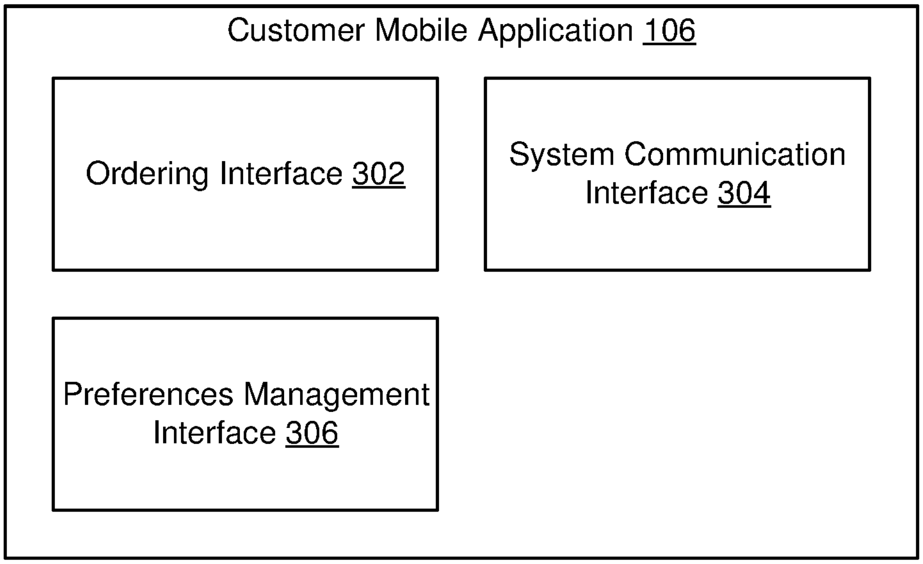
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
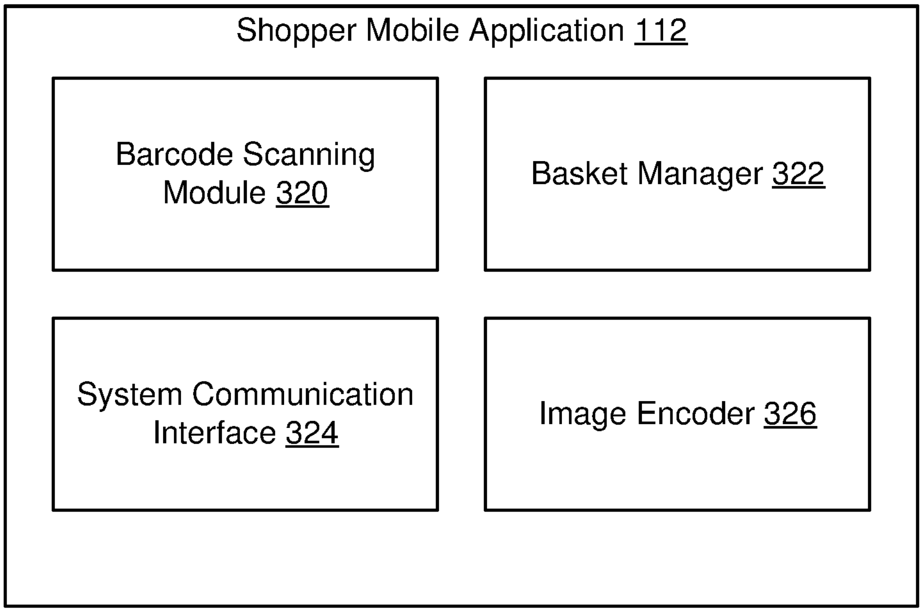
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from system 102 and transmits the contents of a basket of items to system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Distance Travelled Between Two Points by a Shopper

Figure 4:
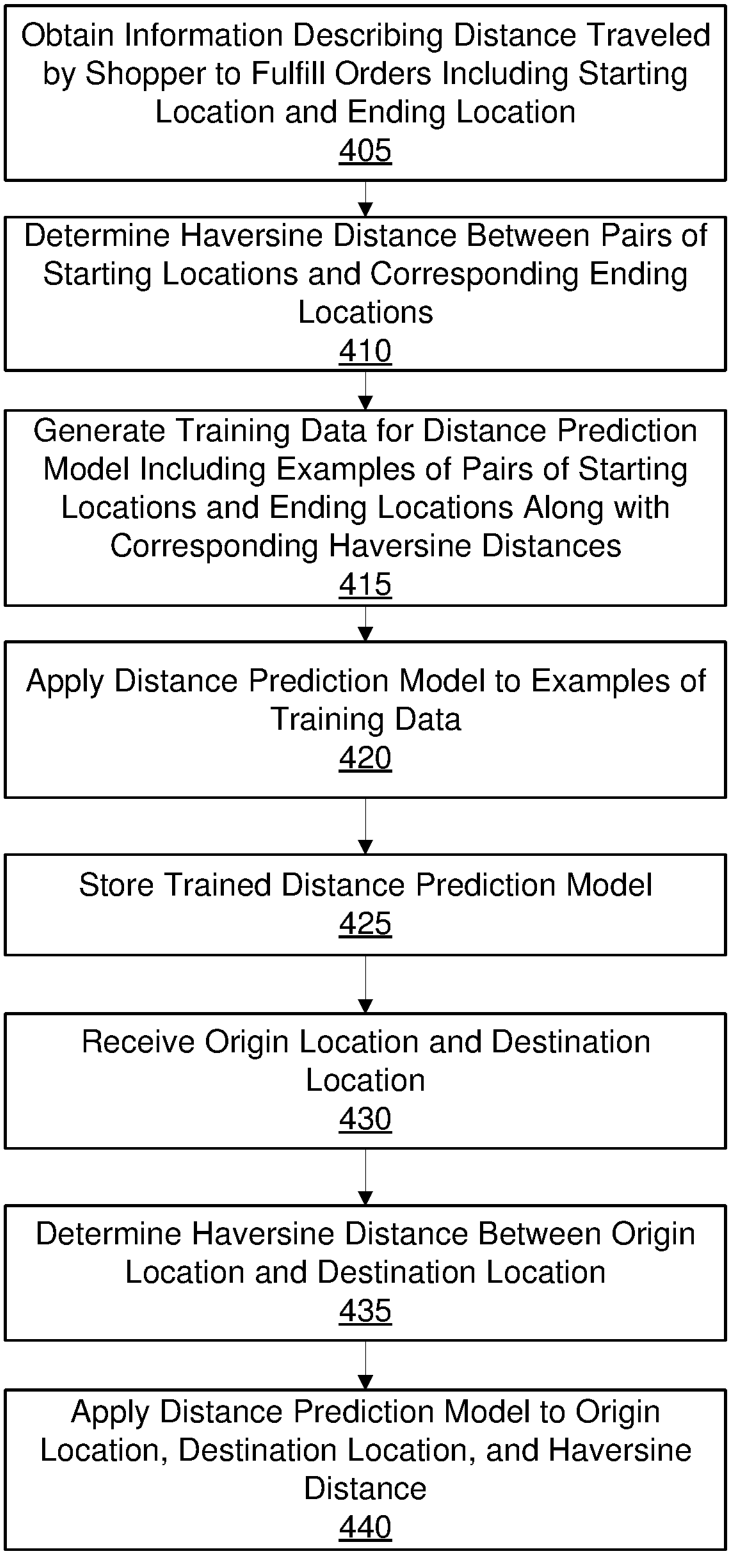
FIG. 4 is a flowchart of a flowchart of one embodiment of a method for an online concierge system predicting a distance for a shopper to travel between two locations, according to one embodiment.

FIG. 4 is a flowchart of one embodiment of a method for an online concierge system 102 predicting a distance for a shopper to travel between two locations. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

As an online concierge system 102 receives orders from users, the online concierge system 102 assigns the orders to shoppers. A shopper obtains one or more items included in an order assigned to the shopper from a warehouse 110 and delivers the items to a location specified by the order to fulfill the order. As a shopper fulfills an order assigned to the shopper, the online concierge system 102 obtains 405 information describing a distance traveled by the shopper to fulfill the order. In some embodiments, the online concierge system 102 receives location information from a client device 110 executing a shopper mobile application 112 providing directions to the shopper for reaching a location when the shopper fulfills the order. This allows the online concierge system 102 to determine a distance travelled by the shopper when fulfilling the order. The online concierge system 102 stores a starting location and a destination location for the order in association with a distance travelled by the shopper when fulfilling the order. In some embodiments, the online concierge system 102 receives directions for the shopper reaching a location specified by the order from a third party system 130 and transmits the received directions to the shopper mobile application 112 for the shopper, providing the shopper with directions for reaching the location identified by the order. In various embodiments, the online concierge system 102 locally stores a copy of the directions received from the third party system 102 in association with a starting location and a destination location, as well as a determined travel distance between the starting location and the destination location. Hence, the online concierge system 102 obtains 405 information describing distances between different pairs of starting locations and destination locations.

The online concierge system 102 leverages the obtained information describing distances between different pairs of starting locations and destination locations to generate and to train a distance prediction model that outputs a predicted travel distance between a starting location and a destination location. To generate the distance prediction model, the online concierge system 102 determines 410 a Haversine distance between pairs of starting location and corresponding destination location in the obtained 405 information. In various embodiments, the starting location comprises a starting latitude and a starting longitude, while the destination location comprises a destination latitude and a destination longitude. In the preceding example, the online concierge system 102 retrieves a starting latitude and a starting longitude and a corresponding destination latitude and a destination longitude from the obtained data and determines 410 a Haversine distance between the starting latitude and the starting longitude and the corresponding destination latitude and destination longitude. The online concierge system 102 generates 415 training data for the distance prediction model comprising a plurality of examples identifying a starting location, a destination location, and a Haversine distance between the starting location and the destination location. For example, each example consists of: a starting location, a destination location, and a Haversine distance between the starting location and the destination location. As an example, an example of the training data consists of a starting latitude, a starting longitude, a destination latitude, a destination longitude, and a Haversine distance determined 410 between the starting latitude and the starting longitude and the destination latitude and the destination longitude. Each example of the training data is labeled with the distance between the pair of the starting location and the destination location obtained 405 by the online concierge system 102. Hence, the online concierge system 102 uses the distances obtained from fulfillment of orders as the labels for training the distance prediction model, allowing the online concierge system 102 to leverage historical information about distances shoppers traveled when fulfilling orders.

The online concierge system 102 applies 420 the distance prediction model to each of a plurality of examples of the training data. For an example of the training data (which includes a starting location, a destination location, and a Haversine distance between the starting location and the destination location), application of the distance prediction model to the user generates a predicted distance for a shopper to travel between the starting location and the destination location. Including the Haversine distance between the starting location and the destination location as an input to the distance prediction model, The online concierge system 102 determines an error term from a difference between the label applied to the example of the training data and the predicted distance for the shopper to travel between the starting location and the destination location. The error term may be generated through any suitable loss function, or combination of loss functions, in various embodiments. For example, the loss function is a mean squared error between a predicted distance for the shopper to travel between the starting location and the destination location from an example of the training data and a label applied to the corresponding example user of the training data. However, in other embodiments, any loss function or combination of loss functions, may be applied to the predicted distance for the shopper to travel between the starting location and the destination location and the label applied to the corresponding example of the training data to generate the error term.

The online concierge system 102 repeatedly backpropagates the one or more error terms from the label applied to an example of the training data and the predicted distance for the shopper to travel between the starting location and the destination location to the user through layers of a network comprising the distance prediction model. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for the layers of the distance prediction network. For example, the online concierge system 102 stores the weights of connections between nodes in the network as the set of parameters of the network in a non-transitory computer readable storage medium. Hence, training of the distance prediction model allows the online concierge system 102 to generate and to store a neural network, or other machine learning model, that generates a predicted distance for a shopper to travel from a starting location to a destination location. The distance prediction model may be any machine learning model, such as a neural network, boosted tree, gradient boosted tree or random forest model in various embodiments. In some examples, the distance prediction model is trained via a XGBoost process when the distance prediction model is applied 420 to examples of the training data. The online concierge system 102 retrains the distance prediction model at various intervals, such as at a periodic interval, in various embodiments, allowing the distance prediction model to account for changes in geographic features or other features of areas proximate to a starting location or to an ending location.

Alternatively, the online concierge system 102 generates the trained distance prediction model as a tree based ensemble model combining multiple decision trees. In various embodiments, the online concierge system 102 selects at least a set of examples of the training data (which each include a starting location, a destination location, and a Haversine distance between the starting location and the destination location) and trains a decision tree on each example of the set by applying a decision tree to each example and comparing a predicted distance from application of the decision tree to an example to a label applied to the example. For example, the decision tree iteratively selects features of an example of the training data and selects a feature causing a loss function to satisfy one or more criteria, for example a feature minimizing a squared error between a predicted distance from the decision tree and a label applied to the example of the training data. The online concierge system 102 sums the loss function over each example of the set to determine a total loss function and selects a feature having a minimum total loss function across the examples of the training data. Subsequently, the online concierge system 102 splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system 102 trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The distance prediction model comprises the set of trained decision trees, with individual decision trees predicting distance for a shopper to travel from a starting location to a destination location from the starting location, the destination location, and a Haversine distance between the starting location and the destination location and the distance prediction model outputting a predicted distance for a shopper to travel from the starting location to the destination location predicted by at least a threshold number of the decision trees.

As another example, the online concierge system 102 trains multiple decision trees in series, training an initial decision tree as described above and determining a loss function for the initial decision tree based on differences between a predicted distance from the decision tree and a label applied to the example of the training data. For example, the loss function is a squared error function between the predicted distance and the label applied to the example of the training data. The online concierge system 102 trains another decision tree based on the results of the loss function for each example of the training data and iteratively trains decision tress, with results of the loss function from a decision tree used to train an immediately subsequent decision tree. For example, a gradient of the loss function from a decision tree is used to train an immediately subsequent decision tree. The online concierge system 102 iteratively trains decision trees from the results of the loss function from another decision tree until a specific number of decision trees are trained or until one or more other halting criteria are satisfied. By iteratively propagating a result of a loss function for a decision tree to a subsequent decision tree, an output of a decision tree compensates for errors from an earlier another tree from which the decision tree receives results of the loss function. The output of the distance prediction model is a combination (e.g., a sum) of the predicted distance for a shopper to travel from the starting location to the destination location output by each of the trained decision trees.

After training and storing 425 the trained distance prediction model, when the online concierge system 102 receives 430 an origin location and a destination location, the online concierge system 102 determines 435 a Haversine distance between the origin location and the destination location and applies 440 the distance prediction model to the origin location, the destination location, and the Haversine distance between the origin location and the destination location. As the distance prediction model accounts for geographic conditions between the origin location and the destination location, providing a more accurate estimation of distance to travel between the origin location than the destination location than the Haversine distance between the origin location and the destination location. In various embodiments, the inputs to the trained distance prediction model are limited to the origin location (e.g., an origin latitude and an origin longitude), the destination location (e.g., a destination latitude and a destination longitude), and a Haversine distance between the origin location and the destination location.

In various embodiments, the online concierge system 102 uses the predicted distance output by the distance prediction model as a feature for one or more additional models. For example, the online concierge system 102 uses the predicted distance from the distance prediction model as an input to a model that generates a predicted time for a shopper traveling from an origin location to a destination location. Additionally, the online concierge system 102 selects one or more combinations of origin location and destination location based on the predicted distances from the distance prediction model and transmits the selected combinations of origin location and destination location to a third party system, which generates navigation information to direct a shopper from the origin location to the destination location. In various embodiments, the online concierge system 102 selects combinations of origin location and destination location having less than a threshold position in a ranking based on predicted distances to transmit to the third party system, allowing the online concierge system 102 to select pairs of origin location and destination locations with predicted distances that minimize an amount of travel by a shopper. In other embodiments, the online concierge system 102 locally generates navigation information directing a shopper from an origin location to a destination location, so the online concierge system 102 selects a set of pairs of origin locations and destination locations based on the predicted distances for a shopper to travel from an origin location to a corresponding destination location in a pair and generates navigation information for a shopper to travel from an origin location to a corresponding destination location in a pair. For example, the online concierge system 102 selects a set of pairs of origin locations and corresponding destination locations having less than a threshold position in a ranking based on predicted distances and generates navigation information for the selected pairs of origin locations and corresponding destination locations for display to shoppers. By selecting the set of pairs of origin location and destination location for which navigation information is generated based on corresponding predicted distances, the online concierge system 102 more efficiently allocations computational resources by limiting a number of pairs of origin locations and destination locations for which navigation information is generated. As generation of the navigation information from an origin location to a destination location uses an increased amount of computational resources and computational time, reducing a number of pairs of origin locations and destination locations for which the navigational information is generated improves efficiency of the online concierge system. In conventional online concierge systems that do not use the distance prediction model further described above, navigation information is generated for a greater number of combinations of origin location and destination location, expending an increased amount of computational resources for navigation information generation and increasing an amount of time used to generate navigation information. Selecting a set of combinations of origin location and destination location based on predicted distances between combinations of origin location and destination location allows the online concierge system 102 to reduce a number of combinations of origin location and destination location for which navigation information is generated by the online concierge system 102 or by a third party system, improving efficiency of allocation of computational resources for generating navigation information.

Figure 5:
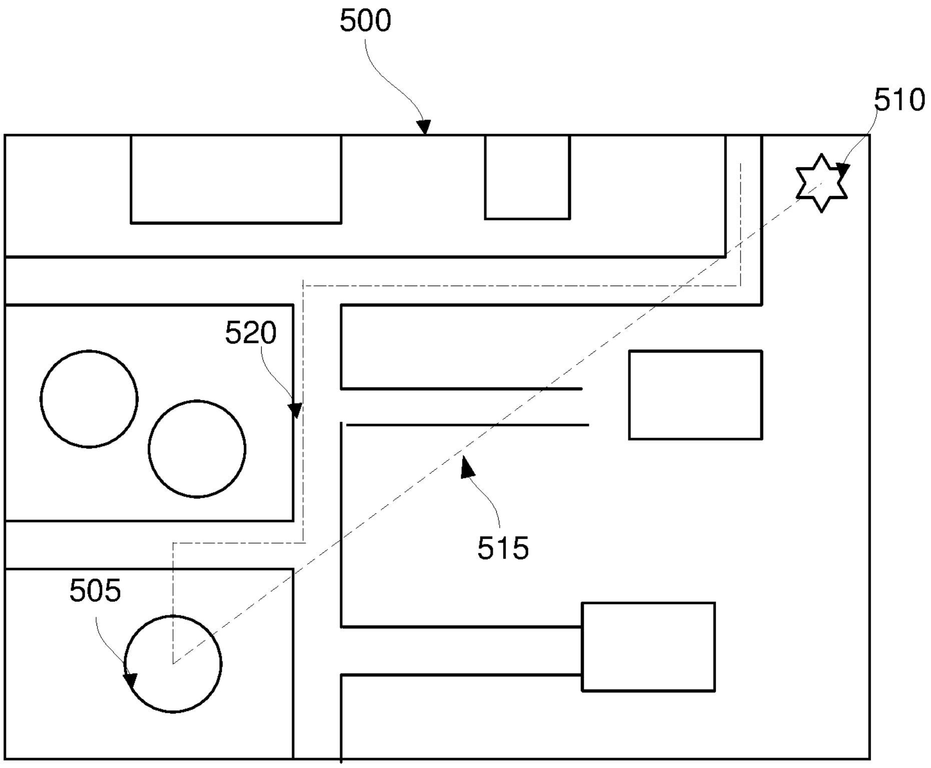
FIG. 5 is an example prediction of a distance for a shopper to travel from an origin location to a destination location, in accordance with an embodiment.

FIG. 5 shows an example prediction of a distance for a shopper to travel from an origin location to a destination location. For purposes of illustration, FIG. 5 shows a map 500 including an origin location 505 and a destination location 510. In various embodiments, the origin location 505 is a combination of an origin latitude and an origin longitude, while the destination location 510 is a combination of a destination latitude and a destination longitude. The online concierge system 102 generates a Haversine distance 515 between the origin location 505 and the destination location 510. While the Haversine distance 515 provides an indication of a distance between the origin location 505 and the destination location 510, the Haversine distance 515 does not account for geographical characteristics of an area between the origin location 505 and the destination location 510. For example, the Haversine distance 515 provides a measure of a direct distance between the origin location 505 and the destination location 510, while the area between the origin location 505 and the destination location 515 includes streets or other geographical features for a shopper to navigate when traveling from the origin location 505 to the destination location 510 rather than directly following the route corresponding to the Haversine distance 515. This limits an accuracy of the Haversine distance 515 in describing a distance for a shopper to travel from the origin location 505 to the destination location 510.

To account for geographical features of an area between the origin location 505 and the destination location 510, the online concierge system 102 applies the distance prediction model, further described above in conjunction with FIG. 4, to the origin location 505, the destination location 510, and the Haversine distance 515 between the origin location 505 and the destination location 510. As further described above in conjunction with FIG. 4, the distance prediction model is trained using distances traversed by a shopper when traveling from a starting location to a destination location, so the distance prediction model accounts for the geographic features between the starting location and the destination location. In the example shown by FIG. 5, the predicted distance output from the distance prediction model accounts for a route 520 that is based on the geographic features between the origin location 505 and the destination location 510, providing a more accurate measure of a distance for a shopper to travel from the origin location 505 to the destination location 510. As the route 520 shown in the example of FIG. 5 is not a direct, or straight-line, path from the origin location 505 to the destination location 510, the predicted distance from the distance prediction model better accounts for the overall distance to travel from the origin location 505 to the destination location 510. This allows the online concierge system 102 to more accurately determine a distance to be traversed from the origin location 505 to the destination location 510, so the online concierge system 102 may more accurately select pairings for origin location 505 and destination location 510 for shoppers to fulfill order and to reduce a number of pairings for origin location 505 and destination location 510 for which navigation information is generated to direct shoppers form the origin location 505 to the destination location 510.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A distance prediction model stored on a non-transitory computer readable storage medium, wherein the distance prediction model is manufactured by a process comprising:

obtaining training data comprising a plurality of examples, each example comprising:

a starting location, a destination location, a Haversine distance between the starting location and the destination location, a time for a picker who traveled from the starting location to the destination location to fulfill one of a plurality of past fulfillment orders, and a label applied to the example, the label comprising a distance traveled by the picker from the starting location to the destination location to fulfill the past fulfillment order, wherein obtaining the distance traveled by the picker comprises obtaining, during fulfillment of the past fulfillment order, information describing the distance traveled by the picker from navigation information provided via a picker mobile application or navigation information received from a third party, and wherein obtaining the training data further comprises storing the starting location and the destination location for the past fulfillment order in association with the distance traveled by the picker;

initializing the distance prediction model that comprises a plurality of layers of a neural network, wherein the distance prediction model is configured to receive a batch of pairs of origin locations and destination locations, each pair comprising location data comprising an origin location, a destination location, and a Haversine distance between the origin location and the destination location, and configured to generate a predicted distance for traveling to the destination locations in the batch in fulfilling a plurality of the past fulfillment orders corresponding to the batch, wherein the location data in at least a subset of the pairs in the batch does not contain navigation information;

for each of a plurality of the examples of the training data:

applying the distance prediction model to the starting location, the destination location, the Haversine distance between the starting location and the destination location, and the time for the picker who traveled from the starting location to the destination location to fulfill one of the plurality of past fulfillment orders to generate a predicted distance between the starting location and the destination location;

backpropagating one or more error terms obtained from one or more loss functions to update a set of parameters of the neural network, the backpropagating performed through the neural network and one or more of the error terms based on a difference between the label applied to the example and the predicted distance between the starting location and the destination location;

stopping the backpropagation after the one or more loss functions satisfy one or more criteria; and storing the set of parameters of the layers of the distance prediction model on the non-transitory computer readable storage medium as parameters of the distance prediction model.

2. The distance prediction model of claim 1, wherein the starting location comprises a starting latitude and a starting longitude.

3. The distance prediction model of claim 1, wherein the destination location comprises a destination latitude and a destination longitude.

4. The distance prediction model of claim 1, wherein the origin location comprises an origin latitude and an origin longitude.

5. The distance prediction model of claim 1, wherein the distance traveled by the picker from the starting location to the destination location comprises distance information received from a picker mobile application that traveled from the starting location to the destination location.

6. A computer program product comprising a non-transitory computer readable storage medium having instructions encoded thereon that, when executed by a processor, cause the processor to:

access a distance prediction model that was generated by:

obtaining training data comprising a plurality of examples, each example comprising:

a starting location, a destination location, a Haversine distance between the starting location and the destination location, a time for a picker who traveled from the starting location to the destination location to fulfill one of a plurality of past fulfillment orders, and a label applied to the example, the label comprising a distance traveled by the picker from the starting location to the destination location to fulfill the past fulfillment order, wherein obtaining the distance traveled by the picker comprises obtaining, during fulfillment of the past fulfillment order, information describing the distance traveled by the picker from navigation information provided via a picker mobile application or navigation information received from a third party, and wherein obtaining the training data further comprises storing the starting location and the destination location for the past fulfillment order in association with the distance traveled by the picker;

initializing the distance prediction model that comprises a plurality of layers of a neural network, wherein the distance prediction model is configured to receive a batch of pairs of origin locations and destination locations, each pair comprising location data comprising an origin location, a destination location, and a Haversine distance between the origin location and the destination location, and configured to generate a predicted distance for traveling to the destination locations in the batch in fulfilling a plurality of the past fulfillment orders corresponding to the batch, wherein the location data in at least a subset of the pairs in the batch does not contain navigation information;

for each of a plurality of the examples of the training data:

apply the distance prediction model to the starting location, the destination location, the Haversine distance between the starting location and the destination location, and the time for the picker who traveled from the starting location to the destination location to fulfill one of the plurality of past fulfillment orders to generate a predicted distance between the starting location and the destination location;

backpropagate one or more error terms obtained from one or more loss functions to update a set of parameters of the neural network, the backpropagating performed through the neural network and one or more of the error terms based on a difference between the label applied to the example and the predicted distance between the starting location and the destination location; and stop the backpropagation after the one or more loss functions satisfy one or more criteria;

receive combinations of origin locations and additional destination locations;

apply the distance prediction model to each received combination of an origin location and a corresponding destination location to generate a predicted distance for traveling from the origin location to the corresponding destination location; and select a set of combinations of origin locations and corresponding destination locations based on the predicted distances.

7. The computer program product of claim 6, wherein select the set of combinations of origin locations and corresponding destination locations based on the predicted distances comprises:

select combinations of origin locations and corresponding destination locations having less than a threshold position in a ranking based on predicted distances.

8. The computer program product of claim 6, wherein the non-transitory computer readable storage medium further has instructions encoded thereon that, when executed by the processor, cause the processor to:

transmit the selected combinations of origin locations and corresponding destination locations to a third party system generating navigation information.

9. The computer program product of claim 6, wherein the starting location comprises a starting latitude and a starting longitude.

10. The computer program product of claim 6, wherein the destination location comprises a destination latitude and a destination longitude.

11. The computer program product of claim 6, wherein the origin location comprises an origin latitude and an origin longitude.

12. The computer program product of claim 6, wherein the distance traveled by the picker from the starting location to the destination location comprises distance information received from a picker mobile application that traveled from the starting location to the destination location.

13. A distance prediction model stored on a non-transitory computer readable storage medium, wherein the distance prediction model is manufactured by a process comprising:

obtaining training data comprising a plurality of examples, each example comprising:

a starting location, a destination location, a Haversine distance between the starting location and the destination location, a time for a picker who traveled from the starting location to the destination location to fulfill one of a plurality of past fulfillment orders, and a label applied to the example, the label comprising a distance traveled by the picker from the starting location to the destination location to fulfill the past fulfillment order, wherein obtaining the distance traveled by the picker comprises obtaining, during fulfillment of the past fulfillment order, information describing the distance traveled by the picker from navigation information provided via a picker mobile application or navigation information received from a third party, and wherein obtaining the training data further comprises storing the starting location and the destination location for the past fulfillment order in association with the distance traveled by the picker;

training a plurality of decision trees where a result of a loss function of a decision tree is an input to a subsequent decision tree, wherein the distance prediction model is configured to receive a batch of pairs of origin locations and destination locations, each pair comprising location data comprising an origin location, a destination location, and a Haversine distance between the origin location and the destination location, and configured to generate a predicted distance for traveling to the destination locations in the batch in fulfilling a plurality of the past fulfillment orders corresponding to the batch, wherein the location data in at least a subset of the pairs in the batch does not contain navigation information;

for each of a plurality of the examples of the training data:

applying a decision tree to the starting location, the destination location, the Haversine distance between the starting location and the destination location, and the time for the picker who traveled from the starting location to the destination location to fulfill one of the plurality of past fulfillment orders;

iteratively propagating a result of one or more loss functions from the decision tree to the subsequent decision tree for the plurality of decision trees, wherein the result of the one or more loss functions is based on a difference between the label applied to the example and the predicted distance between the starting location and the destination location;

stopping the propagation after one or more halting criteria are satisfied; and storing the plurality of decision trees on the non-transitory computer readable storage medium as the distance prediction model.

14. The distance prediction model of claim 13, wherein the distance traveled by the picker from the starting location to the destination location comprises distance information received from a picker mobile application that traveled from the starting location to the destination location.

15. The distance prediction model of claim 13, wherein the destination location comprises a destination latitude and a destination longitude.

16. The distance prediction model of claim 13, wherein the origin location comprises an origin latitude and an origin longitude.

17. The distance prediction model of claim 13, wherein the starting location comprises a starting latitude and a starting longitude.

18. The distance prediction model of claim 1, wherein the one or more loss functions comprise a mean squared error between the predicted distance and the label applied to the example.

19. The computer program product of claim 6, wherein the one or more loss functions comprise a mean squared error between the predicted distance and the label applied to the example.

20. The distance prediction model of claim 13, wherein the one or more loss functions comprise a mean squared error between the predicted distance and the label applied to the example.

* * * * *